Aug. 23, 1955  R. N. WINFREE ET AL  2,715,973
DEPANNING MACHINES
Filed March 10, 1951  3 Sheets-Sheet 1

INVENTORS
Robert N. Winfree
R. Thomas Watts III
BY Young, Emery & Thompson
ATTORNEYS Aug. 23, 1955  R. N. WINFREE ET AL  2,715,973
DEPANNING MACHINES Filed March 10, 1951  3 Sheets-Sheet 2

INVENTORS
Robert N. Winfree &
R. Thomas Watts III

BY Young, Emery & Thompson
ATTORNEYS

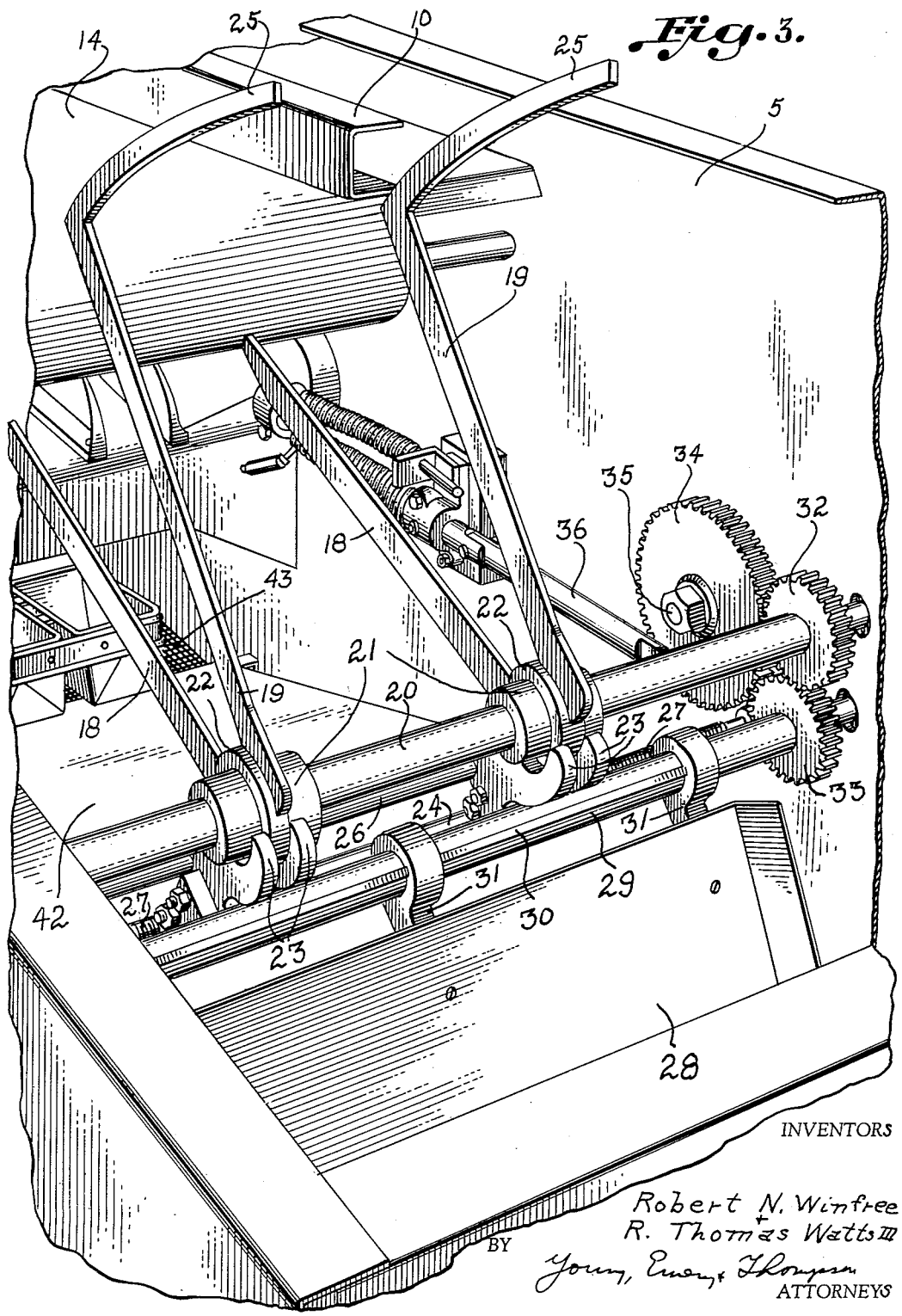

2,715,973

DEPANNING MACHINES

Robert N. Winfree, Lynchburg, and Richard Thomas Watts III, Roanoke, Va.

Application March 10, 1951, Serial No. 214,913

4 Claims. (Cl. 214—308)

This invention relates to a depanning machine and apparatus for bakery products which more specifically unloads bread and other bakery products from the pans and pan units in which they are baked.

It is an object of this invention to provide a machine for depanning loaves of bread in which a pair of double arms are pivoted to rotate through an arc during the receiving of the pan unit and then swing to the position of depanning and back to its initial position in a reciprocating movement. A further object resides in the structure of the double arms so shaped to hold back an oncoming pan to be depanned until the preceding empty pan has dropped from the arm carrier.

Another object of the invention is to provide a machine in which the two pairs of arms manipulate the pans so that the loaves of bread are jarred or knocked out of the pans when they fall between the two pairs of arms and when the leading two arms come to a stop. A further object resides in the provision of a receiving tray which is movable to receive the loaves of bread which are dropped out of the pans and this tray is swung to such close position to the pans that the loaves will fall gently into the tray and thus there is no possibility of injury to the loaves.

Further objects will be apparent from the following description when considered in connection with the accompanying drawings in which:

Figure 3 is a perspective view of the detail of the pan receiving forks.

Figure 1:
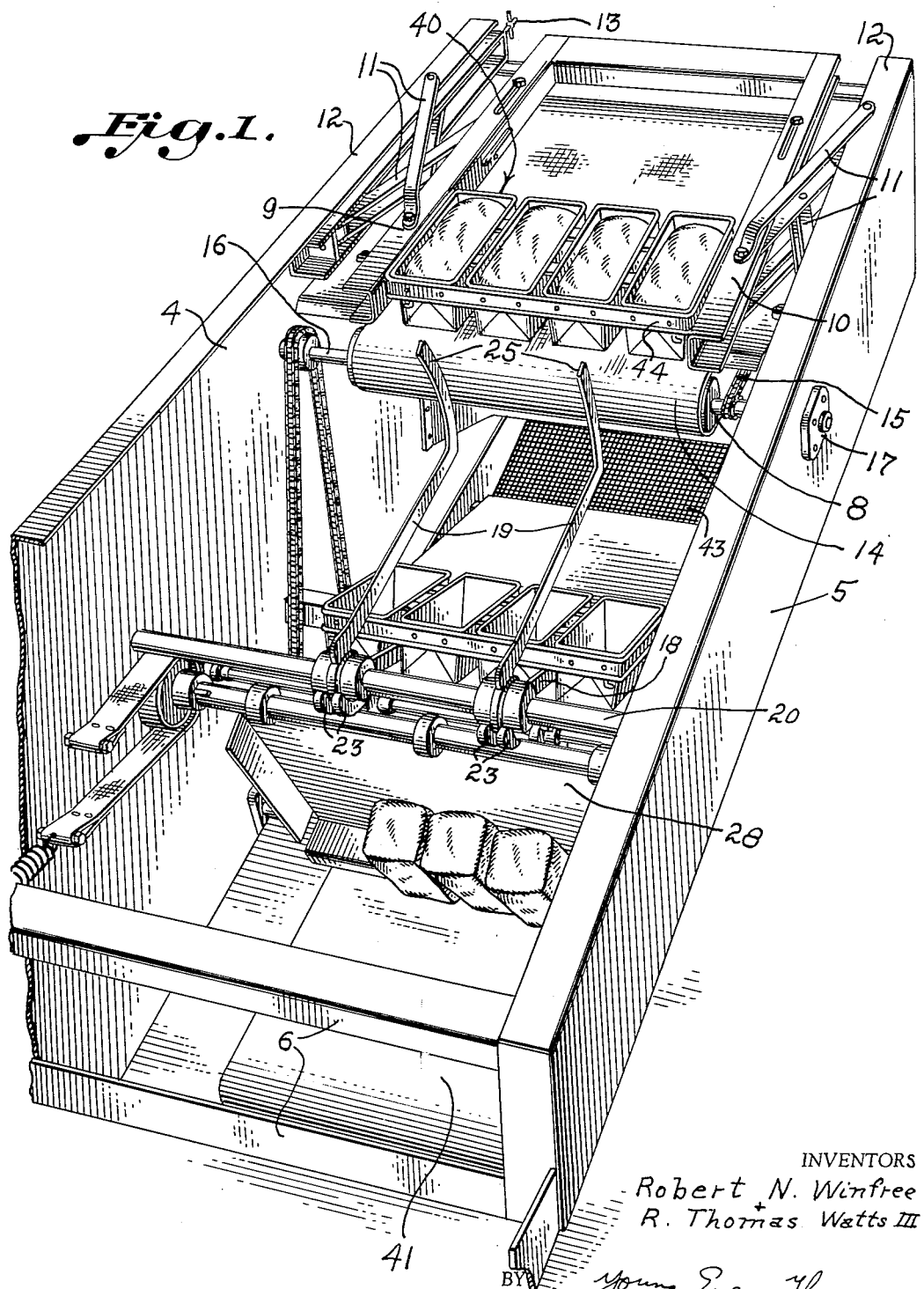
Figure 1 is a top perspective view of the machine.

The various parts of the machine are suitably supported and mounted in a frame consisting of two side plates 4 and 5 interconnected by cross bars or angle irons 6 to secure the frame into a rigid box-like structure. In the top of the frame structure an endless conveyor belt 14 is mounted on rollers as for instance the one shown in Fig. 1 indicated by the reference character 8. This conveyor 14 is made of a suitable material as for instance metal links as it must be rather rugged to withstand the shocks of the hot pan units which it must convey. In order to center the pan units and to adjust for different lengths or widths of units a pair of guide bars 9 and 10 is provided each of which is secured by lever arms 11 to a frame bar 12. A rotatable rod 13 is provided to adjust the lever arms and thereby change the lateral distance between the guide bars 9 and 10.

As shown in Fig. 1 the belt 14 of canvas or wire mesh or of any other suitable material is mounted around rollers one of which is indicated by the reference character 8 which is suitably driven by a chain 15. The roller 8 is mounted to rotate with a shaft 16 which is mounted in bearings 17 on the side plates 4 and 5.

The device for individually receiving the bread pan units is best shown in Fig. 3 in which a pair of arms 18 and 19 are mounted to rotate with a shaft 20. Each pair of arms 18 and 19, of which there are preferably two in number, are mounted on a hub member 21 having a collar 22 which latter engages and cooperates with a curved fork member 23 mounted on a screw-threaded shaft 24. The arm 18 is a straight bar whereas the arm 19 has a curved right angle extension 25 on the end thereof. A further shaft 26 is provided to act as a member to maintain the fork adjusters 23 in rigid relationship. Upon rotation of the shaft 24 manually the fork members 23 are moved axially on the shaft 24 to adjust the fork members toward or away from each other to thus similarly adjust the pairs of arms 18 and 19, the shaft 24 being provided with screw threads 27 which are right hand and left hand at the respective ends thereof. The adjustment of the pairs of arms 18 and 19 is carried out by means of the collars 22 to accommodate pan unit lengths.

There is provided a tray or bread receiving platform 28 which is adjustably and pivotally mounted on a shaft 29, the latter having a longitudinal key way 30 so that the tray 28 will rotate with the shaft 29 by means of arms 31 which may be adjusted axially on the shaft 29 whereby the arms 31 and the tray 28 are adjusted as a unit.

Figure 2:
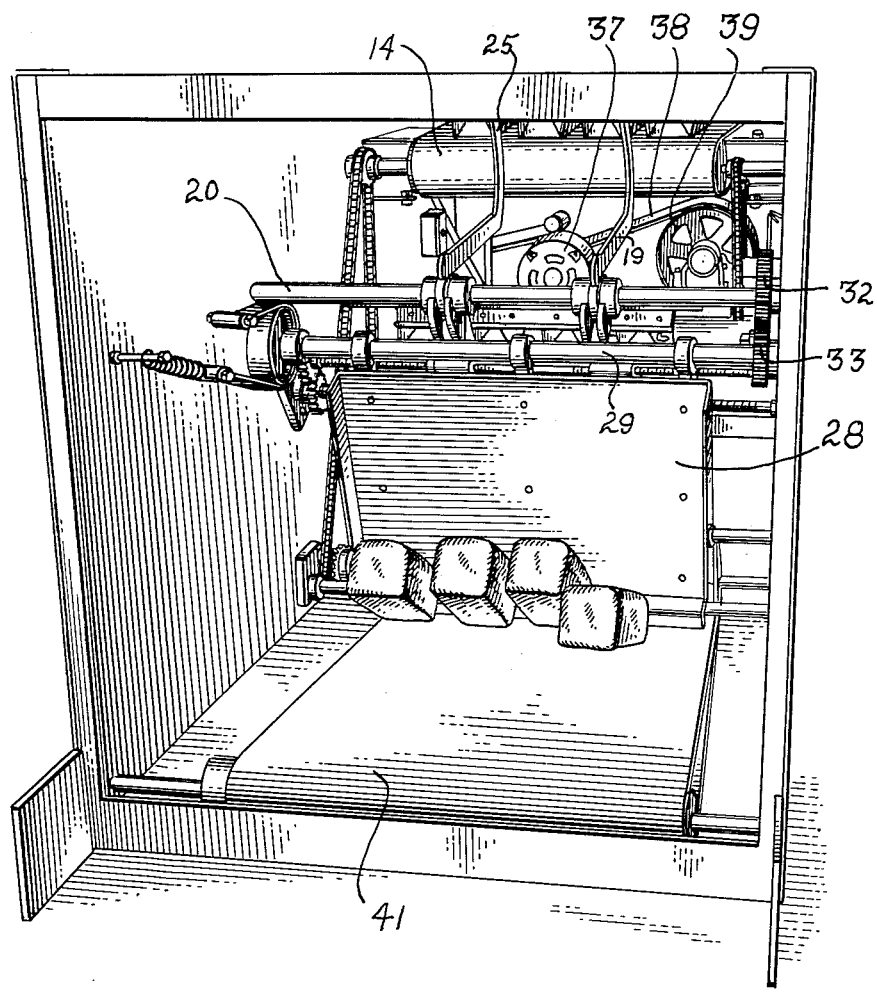
Figure 2 is an end perspective view of the machine.

The arm pairs 18 and 19 as well as the tray member 28 and the shafts 20 and 29 follow so-called reciprocating motions during a cycle of depanning the loaves of bread from the pan units. For this purpose the shaft 20 is provided with a gear wheel 32 which meshes with a similar gear wheel 33 mounted on the shaft 29. A larger gear wheel 34 is in mesh with the gear wheel 33 and this gear wheel 34 is rotatably mounted on a shaft 35 in the frame member 5. The gear wheel 34 receives its intermittent clockwise and counterclockwise motion, without making a complete revolution, by means of a connect-rod 36 which receives its reciprocating motion from a mechanism, not shown, driven by a suitable electric motor 37 with intermediate belt drive 38 and drive wheel 39 as shown in Fig. 2.

The machine operates as follows.

The pan units as for instance the one indicated by the reference character 40 in Fig. 1 is placed on the belt conveyor 14 either by manual means or by any suitable conveyor, not shown, from the oven to the depanning machine. The guide bars 9 and 10 have already been previously adjusted to the length of the pan units. The pan unit 40 is carried forward until it strikes the extension arms 25 which latter holds the unit on the belt while the latter is sliding from under the unit. When the shaft 20 is now rotated so that the arms 19 are lifted and the arms 18 move upwardly the pan unit 40 will be released by the arms 25 so that the unit will now partially fall onto the arms 18, the unit being carried forward upon release by the arms 25 due to the travel of the conveyor belt 14. The pan unit 40 is now carried upwardly and forwardly between the arms 18 and 19, over and past the vertical position and finally when the arms 19 contact a stop between the forks 23 which gently jars the pan unit and the loaves of bread will be released from their respective pans. In the meantime the receiving platform 28 is moved upwardly by the rotation of the shaft 29 so that the loaves of bread have practically no distance to fall. Finally the platform 28 now moves downwardly so that the depanned loaves of bread will slide off of the platform and onto a conveyor 41 to convey the loaves from the machine. While this latter movement is taking place the arms 18 and 19 will be moved backwardly until the arms 18 dip down under the machine as shown in Fig. 1 at the same time that the platform 28 dips back to dump the loaves right side up onto the conveyor 41. As seen in Figs. 1 and 3 the pan units will slide down on a stationary chute 42 and onto a mesh conveyor 43 to be conveyed out of the machine.

As will be evident from the foregoing, the loaves of bread are jarred or knocked out of their respective pans when they together fall between the pairs of arms 18 and 19 and when the leading two arms 19 come to a stop. There is a good deal of play between the two pairs of arms of each fork and consequently the pan unit has from two to three inches to fall before the pan strap 44 contacts the arms 18 when the forks of arms 18 and 19 come to a sudden stop. The receiving platform or chute 28 has swung up to a position directly under the pan unit so that the loaves of bread which have been jarred loose will drop out of the pan a very short distance to be received gently on the platform with thus no chance of injury.

The machine has various operating elements operable so that the conveyors 14, 41 and 43 will move continuously in one direction whereas the arms 18 and 19 and the platform 28 move intermittently in a reciprocating relationship relative to those elements.

We claim as our invention:

1. A depanning machine for bakery products particularly loaves of bread, comprising a frame, a shaft rotatably mounted in the frame, a pair of forked arms mounted to rotate with the shaft, the pans to be depanned being received between the pairs of arms, a tray pivotally mounted in the frame, and means for intermittently rotating the pair of forked arms through an arc of a circle and to rotate the tray in synchronized operative relationship whereby the tray will be moved adjacent the fork members to receive the bakery products which fall from the pans as the latter are swung through an arc of a circle in the fork members, one of the forked arms of each pair having an extension to hold the pans out from between the arms until the arms have moved to a receiving position.

2. A depanning machine for bakery products particularly loaves of bread, comprising a frame, a conveyor horizontally movable in the frame to receive the pans containing the loaves to be depanned, a pair of forked arm members rotatably mounted to rotate through an arc of a circle in the frame from an approximately horizontal position adjacent the conveyor through an arc upwardly and past a vertical position, the pans to be depanned being received between the pairs of arms, a tray rotatably mounted in the frame operable to rotate to a position under the forked arms as the latter rotate past the vertical position to a position where the pans are in an inverted position to receive the loaves of bread as they leave the pans, and means for operating the forked arms and the tray so that they will operate in synchronized relationship, each of the forked arms being provided with means to hold the pans on the conveyor until the arms are in position to receive the next pan.

3. A depanning machine for bakery products particularly loaves of bread, comprising a frame, a conveyor horizontally movable in the frame to receive the pans containing the loaves to be depanned, a pair of forked arm members rotatably mounted to rotate through an arc of a circle in the frame from an approximately horizontal position adjacent the conveyor through an arc upwardly and past a vertical position, the pans to be depanned being received between the pairs of arms, a tray rotatably mounted in the frame operable to rotate to a position under the forked arms as the latter rotate past the vertical position to a position where the pans are in an inverted position to receive the loaves of bread as they leave the pans, and means for operating the forked arms and the tray so that they will operate in synchronized relationship, each of the forked arms being provided with a curved right angle extension pointed upwardly from the machine to hold the pans on the conveyor until the arms are in position to receive the next pan.

4. A depanning machine for bakery products particularly loaves of bread, comprising a frame, a conveyor horizontally movable in the frame for feeding panned bread to a depanning station, a depanning device at said station, said depanning device including a pair of forked arms each having forward and rearward portions rotatably mounted to swing through an arc of a circle in the frame from an approximately horizontal position adjacent the conveyor through an arc upwardly and past a vertical position so that the pans fall forwardly to strike the forward portion of the arms thereby jarring the bread from the pans, each of the forked arms being provided with an extension to hold the pans out from between the arms until the arms have moved to a receiving position, means to rotate the arms, means to remove the depanned bread and means to remove the empty pans.

References Cited in the file of this patent

UNITED STATES PATENTS

| 610,635 | McKay | Sept. 13, 1898 |
| 1,561,664 | Rathwell | Nov. 17, 1925 |
| 1,879,393 | Miller | Sept. 27, 1932 |
| 2,268,220 | Marshall | Dec. 30, 1941 |
| 2,365,007 | Rideout et al. | Dec. 12, 1944 |
| 2,524,656 | Eyster | Oct. 3, 1950 |